US012095201B2

(12) United States Patent
Burrow et al.

(10) Patent No.: US 12,095,201 B2

(45) Date of Patent: Sep. 17, 2024

(54) PLUG FOR A SUBSEA CONNECTOR THAT INCLUDES A RECEPTACLE

(71) Applicant: Siemens Energy Global GmbH & Co. KG, Munich (DE)

(72) Inventors: Christopher Burrow, Ulverston (GB); Scott Spencer, Barrow-in-Furness (GB); Daniel Walton, Carnforth (GB)

(73) Assignee: Siemens Energy Global GmbH & Co. KG, Munich (DE)

(*) Notice: Subject to any disclaimer, the term of this patent is extended or adjusted under 35 U.S.C. 154(b) by 289 days.

(21) Appl. No.: 17/694,805

(22) Filed: Mar. 15, 2022

(65) Prior Publication Data

US 2022/0302636 A1 Sep. 22, 2022

(30) Foreign Application Priority Data

Mar. 17, 2021 (GB) ..................................... 2103663
Mar. 17, 2021 (GB) ..................................... 2103664
(Continued)

(51) Int. Cl.
*H01R 13/523* (2006.01)
*H01R 13/24* (2006.01)
(Continued)

(52) U.S. Cl.
CPC ....... *H01R 13/523* (2013.01); *H01R 13/2421* (2013.01); *H01R 13/2471* (2013.01);
(Continued)

(58) Field of Classification Search
CPC .............. H01R 13/523; H01R 13/2421; H01R 13/2471; H01R 13/502; H01R 13/5202;
(Continued)

(56) References Cited

U.S. PATENT DOCUMENTS 3,742,427 A 6/1973 Ballard
4,142,770 A * 3/1979 Butler, Jr. ............ H01R 13/523
439/140

(Continued)

FOREIGN PATENT DOCUMENTS

FR 2895577 A1 6/2007
GB 2338119 A 12/1999
WO 2021037949 A1 3/2021

*Primary Examiner* — Thanh Tam T Le

(74) *Attorney, Agent, or Firm* — Wolter Van Dyke Davis, PLLC

(57) ABSTRACT

A plug part for a subsea connector, the connector includes a plug and a receptacle. The plug part includes one or more female conducting contact assemblies each female conducting contact assembly including a female contact including inner and outer conducting surfaces, the inner conducting surface defining a cavity of the one or more female conducting contact assemblies and each female contact unit further including a shuttle pin adapted to receive a male contact pin of a receptacle. The female contact assembly further includes a solid insulator mounted radially outward of the external surface and forming an annulus between the outer surface of the female contact and an inner surface of the solid insulator and an orifice between the cavity and the annulus.

13 Claims, 5 Drawing Sheets

(30) Foreign Application Priority Data

Mar. 17, 2021 (GB) ...................................... 2103666
Mar. 17, 2021 (GB) ...................................... 2103667
Mar. 17, 2021 (GB) ...................................... 2103668
Mar. 17, 2021 (GB) ...................................... 2103669

(51) Int. Cl.

| | |
|---|---|
| ***H01R 13/502*** | (2006.01) |
| ***H01R 13/52*** | (2006.01) |
| ***H01R 13/533*** | (2006.01) |
| ***H01R 13/627*** | (2006.01) |
| ***H01R 13/629*** | (2006.01) |
| ***H01R 24/86*** | (2011.01) |
| *H01R 13/622* | (2006.01) |
| *H01R 13/66* | (2006.01) |

(52) U.S. Cl.

CPC ....... *H01R 13/502* (2013.01); *H01R 13/5202* (2013.01); *H01R 13/5219* (2013.01); *H01R 13/5227* (2013.01); *H01R 13/533* (2013.01); *H01R 13/6271* (2013.01); *H01R 13/629* (2013.01); *H01R 13/62961* (2013.01); *H01R 24/86* (2013.01); *H01R 13/622* (2013.01); *H01R 13/6675* (2013.01); *H01R 2201/04* (2013.01); *H01R 2201/26* (2013.01)

(58) Field of Classification Search

CPC ............ H01R 13/5219; H01R 13/5227; H01R 13/533; H01R 13/6271; H01R 13/629; H01R 13/62961; H01R 13/622; H01R 13/6675; H01R 24/86; H01R 2201/04; H01R 2201/26

See application file for complete search history.

(56) References Cited

U.S. PATENT DOCUMENTS

| | | | | |
|---|---|---|---|---|
| 5,645,442 | A * | 7/1997 | Cairns .................. | H01R 13/523 439/271 |
| 6,464,405 | B2 | 10/2002 | Cairns et al. | |
| 7,695,301 | B2 * | 4/2010 | Mudge, III .......... | H01R 13/533 439/732 |
| 7,959,454 | B2 * | 6/2011 | Ramasubramanian ...................... | H01R 13/523 439/201 |
| 8,267,707 | B2 * | 9/2012 | Rogers ................... | H01R 13/52 439/271 |
| 9,028,264 | B2 * | 5/2015 | Head .................... | H01R 13/523 439/190 |
| 10,014,678 | B2 | 7/2018 | Barrett et al. | |
| 10,044,134 | B2 * | 8/2018 | Nicholson .......... | H01R 13/5219 |
| 10,181,692 | B2 * | 1/2019 | Flaherty, IV .......... | H01R 4/304 |
| 10,209,460 | B2 * | 2/2019 | Tucker ................. | G02B 6/3821 |
| 10,704,353 | B2 | 7/2020 | Painter et al. | |
| 10,946,939 | B1 * | 3/2021 | Montague ............... | B63B 32/66 |
| 10,958,013 | B1 * | 3/2021 | Peng ...................... | H01R 24/28 |
| 2007/0259568 | A1 | 11/2007 | Mackillop et al. | |

* cited by examiner

PLUG FOR A SUBSEA CONNECTOR THAT INCLUDES A RECEPTACLE

CROSS REFERENCE TO RELATED APPLICATIONS

This application claims the benefit of United Kingdom Application Nos. GB 2103663.7, GB 2103664.5, GB 2103666.0, GB 2103667.8, GB 2103668.6, GB 2103669.4 all filed on 17 Mar. 2021, and all incorporated by reference herein in their entirety.

FIELD OF INVENTION

This invention relates to a subsea, or underwater, connector and a method of operating the connector.

BACKGROUND OF INVENTION

Subsea, or underwater, connectors are designed to operate beneath the surface of the water. Typically, a subsea connector comprises two parts, generally known as plug and receptacle. The receptacle may include one or more conductor pins and the plug may include corresponding plug sockets for the receptacle conductor pins. The connection may be made topside (dry-mate), or subsea (wet-mate) and the specific design is adapted according to whether the connector is a wet-mate or dry-mate connector. Subsea connectors have various applications including power connectors which supply power to subsea equipment, or control and instrumentation connectors which exchange data between different pieces of subsea equipment, or between subsea equipment and topside devices.

SUMMARY OF INVENTION

In accordance with a first aspect of the present invention, a plug part for a subsea connector is provided, the connector comprising a plug and a receptacle, the plug part comprising one or more female conducting contacts, each female conducting contact assembly comprising a female contact comprising inner and outer conducting surfaces, the inner conducting surface defining a cavity of the one or more female conducting contact assemblies; each female contact assembly further comprising a shuttle pin within the cavity adapted to receive a male contact pin of a receptacle part; wherein each of the one or more female contact assemblies further comprising a solid insulator mounted radially outward of the outer conducting surface and forming an annulus between the outer conducting surface of the female contact and an inner surface of the solid insulator; wherein each of the one or more female contact assemblies further comprises an orifice in the female contact, the orifice providing a fluid channel between the annulus and the cavity, whereby fluid contained in a closed volume formed by the annulus, orifice and cavity, may flow between the annulus and the cavity.

At least one of the annulus and the female contact cavity may contain an insulating pressure compensating fluid.

The combination of a solid electrically insulating material with a fluid filled annulus enables pressure compensation to be provided by virtue of movement of fluid between the inside of the female contact and the annulus, whilst improving electrical insulation resistance of the connector by using solid insulation, rather than oil and an elastomeric diaphragm, both of which are permeable to water and degrade over time.

The plug may further comprise a diaphragm, mounted radially outwardly of the solid insulator and defining a secondary fluid chamber formed between an outer surface of the annulus and an inner surface of the diaphragm.

The closed volume may further comprise the secondary fluid chamber.

The diaphragm is mounted outside the solid insulation and the fluid chamber formed between the outer surface of the solid insulator and the inner surface of the diaphragm is in fluid communication with the annulus, enabling pressure compensation.

An insulating pressure compensating fluid may be provided in the secondary fluid chamber.

The pressure compensating fluid may comprise an electrically insulating fluid.

A channel may be formed between the annulus and the secondary fluid chamber.

This allows the pressure compensation fluid to move between the annulus and the fluid chamber and flexibility of the diaphragm allows the fluid chamber to expand and contract accordingly.

The pressure compensating fluid may comprise oil.

The pressure compensating fluid is chosen to be electrically insulating to improve the overall electrical insulation resistance, but is not the primary source of insulation resistance.

The female contact may further comprise one or more orifices to allow passage of the pressure compensating fluid between the cavity of the inner surface of the female contact and the annulus.

Provision of at least one orifice in the body of the contact pin improves fluid flow between the contact pin and the annulus during mating and demating The solid insulator may comprise a polymeric or thermoplastic material, in particular polyether ether ketone (PEEK), or polyamide-imide (PAI).

High performance polymer materials provide good electrical insulation, long term mechanical stability, as well as being inert to oil.

The plug may comprise a plurality of female contacts and corresponding solid insulators.

The invention is particularly applicable to multipin connectors, in which individually providing effective electrical insulation is difficult using conventional oil and diaphragm techniques because of the small size.

In accordance with a second aspect of the present invention, a wet-matable subsea connector comprises a plug according to the first aspect and a receptacle.

BRIEF DESCRIPTION OF THE DRAWINGS

An example of a subsea connector and associated method of operation in accordance with the present invention will now be described with reference to the accompanying drawings in which.

DETAILED DESCRIPTION OF INVENTION

Figure 1A:
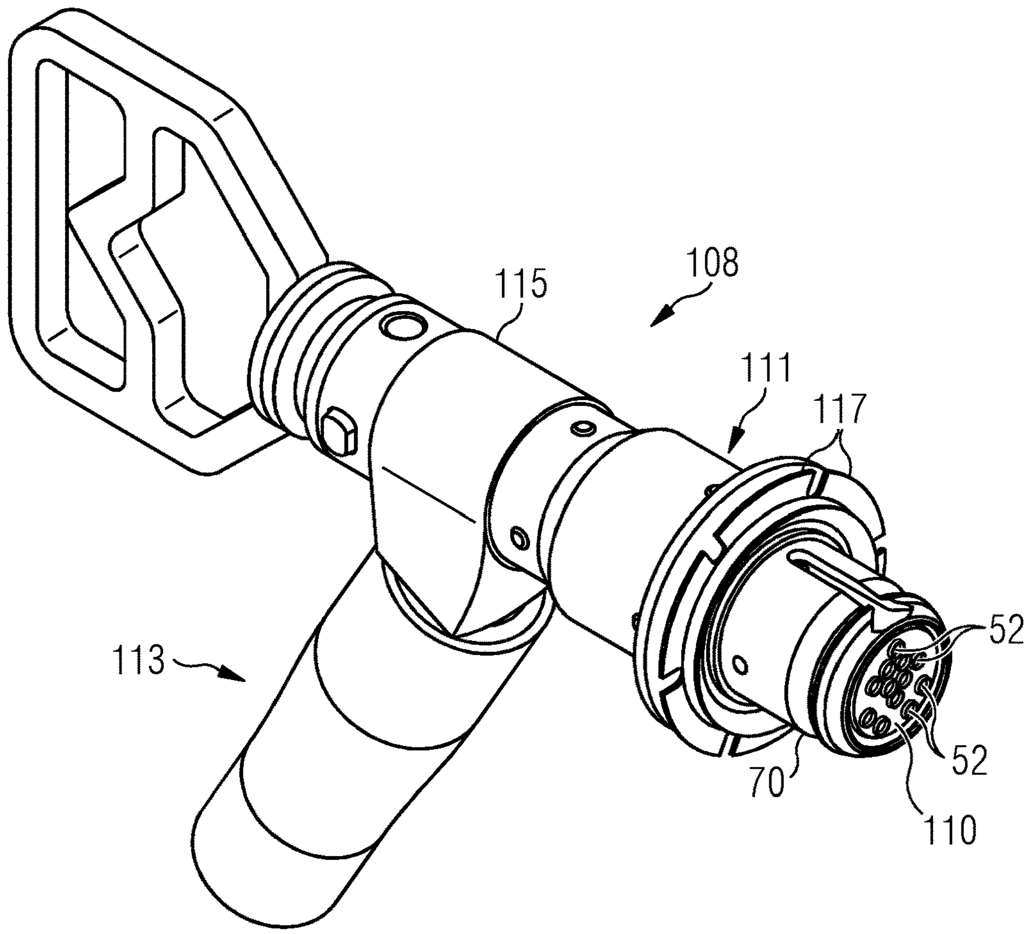
FIGS. 1A and 1B illustrate an example of a plug and receptacle in which a plug part according to the present invention may be used, before mating.

The drive to reduce overall lifecycle costs, both capital expenditure (CAPEX) and operational expenditure (OPEX), associated with new deep-water oil and gas developments means that improvements to existing designs, manufacturing processes and operation are desirable. Subsea connector systems are desired that have a lower cost, can be relatively quickly and easily installed and that have reduced maintenance requirements, or need for intervention which affects the systems to which they are connected throughout their working life. Thus, connectors which continue to perform without degradation, over a longer period of time, are desirable.

Typically, connectors for different applications may be single or multi-way connectors. For example, a 4-way connector may be used for delivering power, or a 12-way connector for data transfer via a suitable subsea instrumentation interface standard. This may be level 1, for analogue devices, level 2 for digital serial devices, e.g CANopen, or level 3. using Ethernet TCP/IP. Other data connectors, include optical fibre connectors. Wet mateable controls connectors typically have large numbers of thin conductor pins, in order that multiple control signals to different parts of a product can be included in a single control cable. For example, multiple subsea sensors on different pieces of equipment, such as flow sensors, temperature sensors, or pressure sensors each need to have a separate communication path, so that they can be interrogated, monitored and if necessary, actuators can be energised, for example to open or close a valve, or to start or stop a pump. Power transmission may be required for the purpose of supplying power to subsea equipment to enable it to operate, for example to close a valve, or drive a pump. Wet mateable power connectors may have a single pin and socket arrangement, or may be multi-way connectors, but typically with fewer, larger, pins than a control or communications connector.

Female contacts within a subsea connector plug are typically enveloped by dielectric oil contained within an elastomeric diaphragm, with individual diaphragms surrounding individual contacts, each sealed at the front by a sliding piston, or shuttle pin, that retracts into the female contact when an equally sized male contact pin engages with it and passes through the diaphragm opening, maintaining a seal. The insulation resistance of the electrical contacts is limited by the insulation resistance of the dielectric oil. However, the insulation performance of dielectric oils is known to degrade with time and moisture is a significant degrading mechanism. Multiple mates/de-mates of connectors can lead to some water ingress into a connector, and permeation through elastomers leads to an increase in water content and hence moisture absorption of the dielectric oils, which is directly correlated with a reduction in the insulation resistance of the oil.

Conventionally, a wet mateable plug and receptacle have relied upon an oil filled diaphragm in the plug to provide electrical insulation for the conductor pins. Assembly of such parts becomes more difficult as the size of the conductors reduces. Thus, a power connector, with a single, relatively large, pin is more easily protected by an oil filled diaphragm, than a multi-way communications connector, where the connector and the pins within it are much smaller. In particular, the process of filling the diaphragm with oil and testing are difficult for multiple, smaller, conductor pins.

Figure 1B:
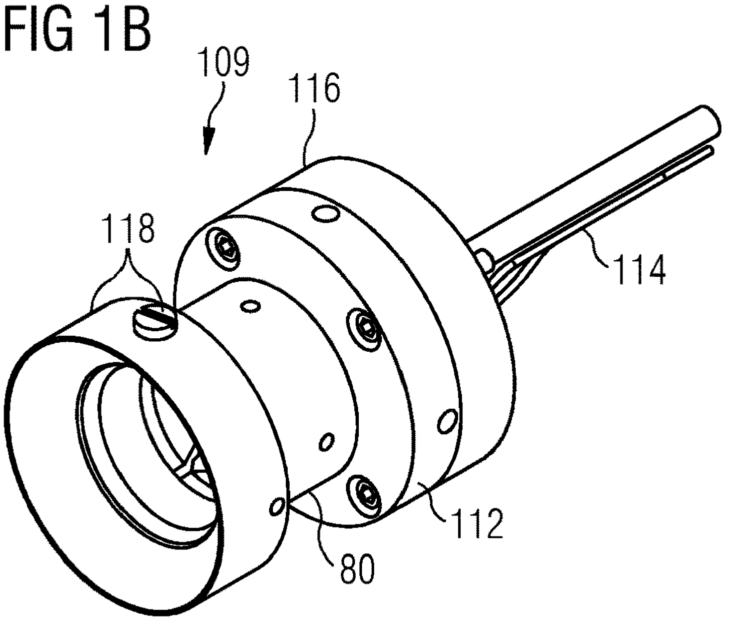

A subsea connector according to the present invention comprises a plug part 1 and a receptacle part 2 as illustrated in FIGS. 1*a* and 1*b*. The plug part 1 in the example illustrated in these figures comprises an ROV flying plug connector 108 and the receptacle part 2 in these figures comprises an ROV bulkhead receptacle connector 109, although the invention is applicable to any form of subsea connector, for example the plug part and receptacle part may be parts for a stab mate or a diver mate connector. However, the detail described hereinafter for the construction and operation of the plug and receptacle bodies is the same. The plug 1 and receptacle 2 of the present invention comprise housings 70, 80 and for this particular example of an ROV connector, an ROV handle connects into an ROV flying backend assembly 115 which may receive a cable or hose 113 connected to a mount section 111. Additional ROV plug ancillaries 117 may be mounted through a plug body 110 in the plug front end housing 70 having data and power contacts to receive corresponding data and power pins 52 from the receptacle. The corresponding ROV bulkhead receptacle connector 109 includes ROV receptacle ancillaries 118 in a front section and bulkhead back end 116 behind the mounting section 112. Conductors from a cable termination 114 into the back end 116 may connect with the conductor pins 52 in the receptacle body. When mated the receptacle pins 52 and plug contacts 51 are in electrical contact.

Figure 2:
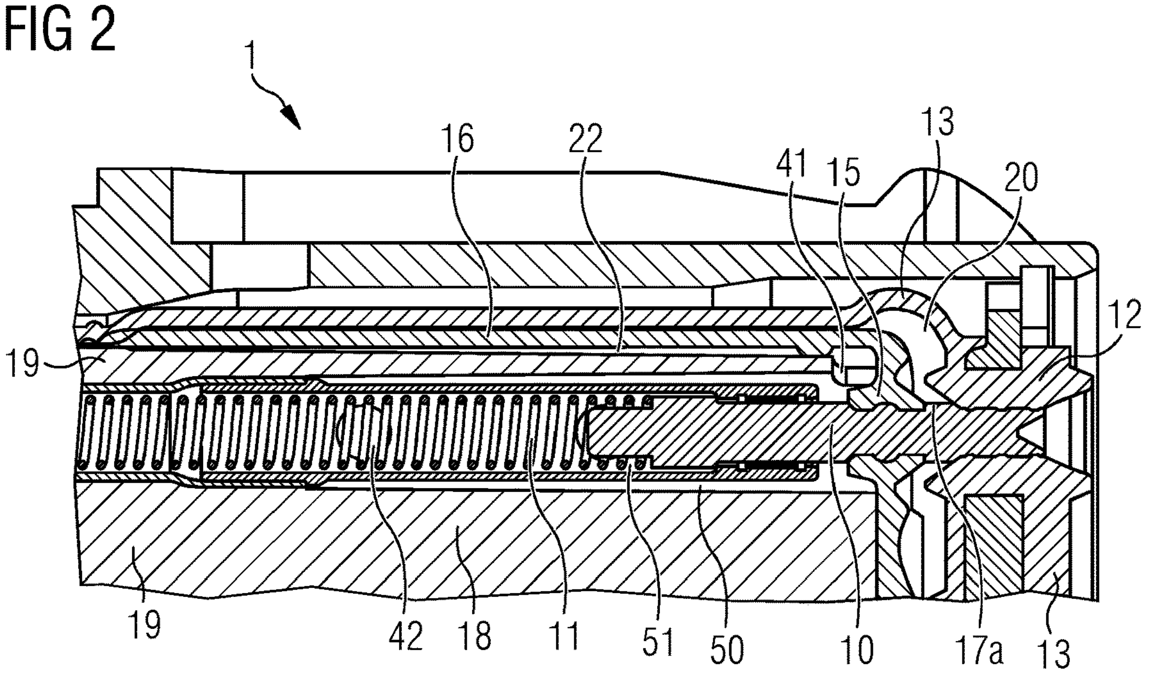
FIG. 2 illustrates an example of a plug for a subsea connector including a plug part according to the present invention, in more detail, before mating.
Figure 3:
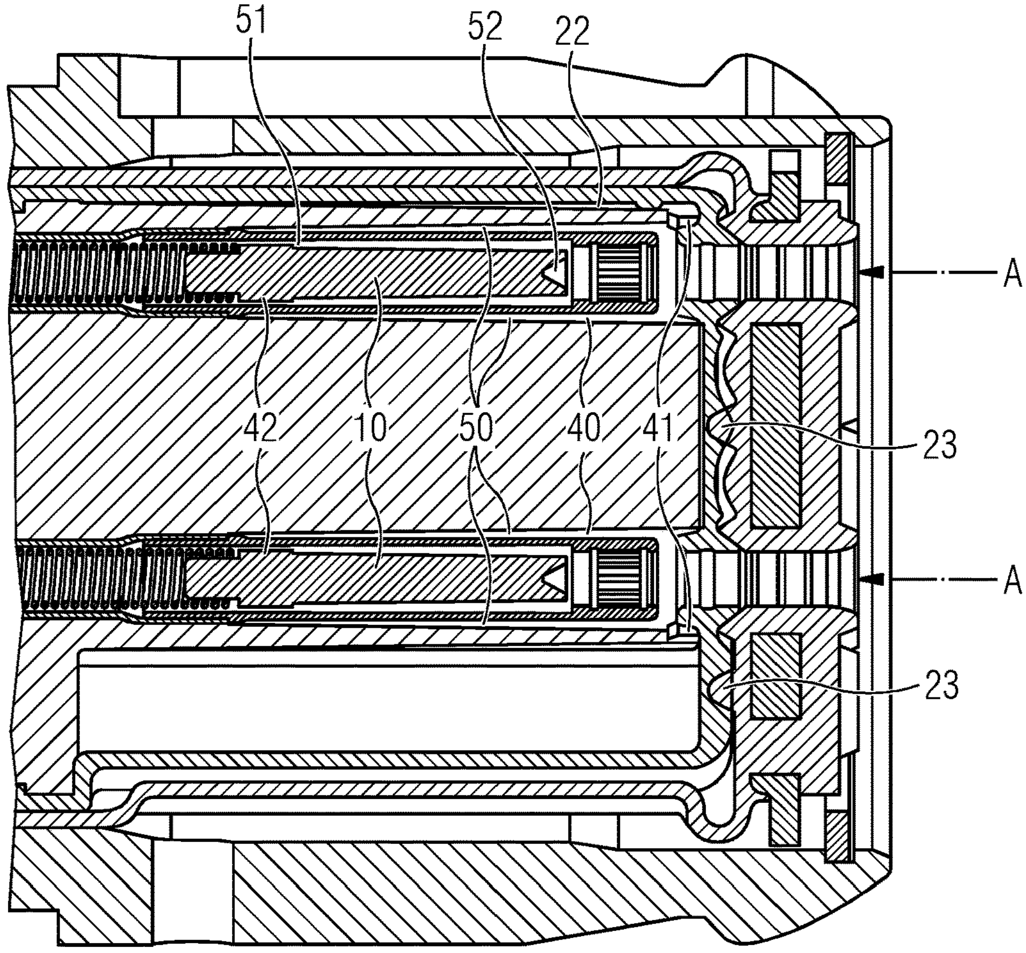
FIG. 3 illustrates an example of a plug for a subsea connector including a plug part according to the present invention, in more detail; after mating.

The connector plug 1 of the present invention addresses the assembly and protection problems described above, as illustrated in more detail in FIG. 2. A shuttle pin 10 is mounted for movement on a shuttle pin spring 11. The shuttle pin spring is mounted in a socket contact subassembly 18 in a plug body 19, made from an electrically insulating material. An end of the shuttle pin remote from the shuttle pin spring 11 seals against a primary diaphragm front seal 12 of a primary diaphragm 13, whilst another section 14 of the shuttle pin 10 seals against a secondary diaphragm seal 15 of a secondary diaphragm 16. As can be seen in FIG. 2, a gap 17*a* is formed between the primary diaphragm seal 12 and the secondary diaphragm seal 15 when demated. A profile of the shuttle pin 10 changes along its length, in particular forming a shoulder against corresponding surfaces of the front seal 12 and back seal 15. A primary dielectric oil chamber 20 is formed between the two diaphragms 13, 16 and a secondary dielectric oil chamber 22 is formed within the plug body 19 between an outer surface of a solid insulator 50 and an inner surface of the secondary diaphragm 16. Curvature 21 in the primary diaphragm gives axial compliancy. The compliant nature of the secondary diaphragm 16 allows it to flex as a pressure compensating fluid moves in and out of the secondary fluid chamber 22. FIGS. 1A, 1B and 2 illustrate the plug before mating with the receptacle of the connector takes place. FIG. 3 shows the effect on the plug seals that mating with the receptacle has.

The plug 1 is manufactured with a female contact 51 of the socket sub assembly 18, typically formed from a hollow metal cylinder, having a cavity formed within the female contact, the cavity being defined by the inner conducting surface. A layer of solid insulation 50 is mounted radially outward of the female contact 51. The female contact includes a first section over which the solid insulation is moulded, so that the solid insulation is in intimate contact with that section and a second section in which an annulus 40 is formed between an outer conducting surface 56 of the female contact 51 and an inner surface 57 of the layer of solid electrical insulation 50. An orifice 42 is provided by which fluid flow between the cavity and the annulus is enabled. The shuttle pin 10 within the socket contact cavity seals the contact cavity in a conventional manner, when there is no receptacle pin 52 present to push the shuttle pin 10 into the socket contact. However, instead of relying on an oil filled diaphragm to provide electrical insulation, the electrical insulation of the female contacts is provided by the solid insulation layer 50 that forms the annulus 40.

The annulus 40 itself may be fluid filled to provide pressure compensation, using movement of the fluid between the contact cavity, within the contact 51, through the orifice 42, to the annulus 40 and the secondary fluid chamber 22, for pressure compensation during mating and demating. The secondary fluid chamber 22 acts as a reservoir to contain flowing oil, and by virtue of it being constructed from a flexible material, such as rubber, it allows for the reservoir to be pressure compensated. However, the way in which the fluid pressure compensation is provided, in this example by means of a flexible diaphragm is not the only way of providing pressure compensation and the secondary fluid chamber may be replaced with another suitable pressure compensation mechanism. Fluid flow from the annulus to the secondary fluid chamber is via channels 41. Any electrically insulating effect of the fluid is purely secondary and the pressure compensation fluid does not have to be relied on as an insulating medium, although the fluid is typically an insulating oil.

The solid insulation may be a polymer or thermoplastic material, for example, polyether ether ketone (PEEK), or other high performance polymer materials, such as polyamide-imide, running along the full length of the socket assembly 18 forming the fluid filled annulus 40, along part of the length of the contact. The orifices 42 in the body of the socket contact 51 enhance fluid flow between the annulus 40 and the socket contact cavity. A closed volume is formed by the cavity, the orifice and the annulus. Fluid flow from the annulus 40 to the secondary fluid chamber 22 of the secondary diaphragm 16 may be achieved by providing a channel 41, or other opening at one end of the annulus. In that case, the closed volume includes the secondary fluid chamber 22. Insulation resistance of the connector is improved by means of the overmoulded socket assembly. By introducing into the insulation system around the female contact, a solid dielectric, that maintains stable electrical properties under a wide set of environmental conditions and minimizes reliance on the dielectric oil, the overall stability of the insulation resistance of the connector is improved.

Figure 4:
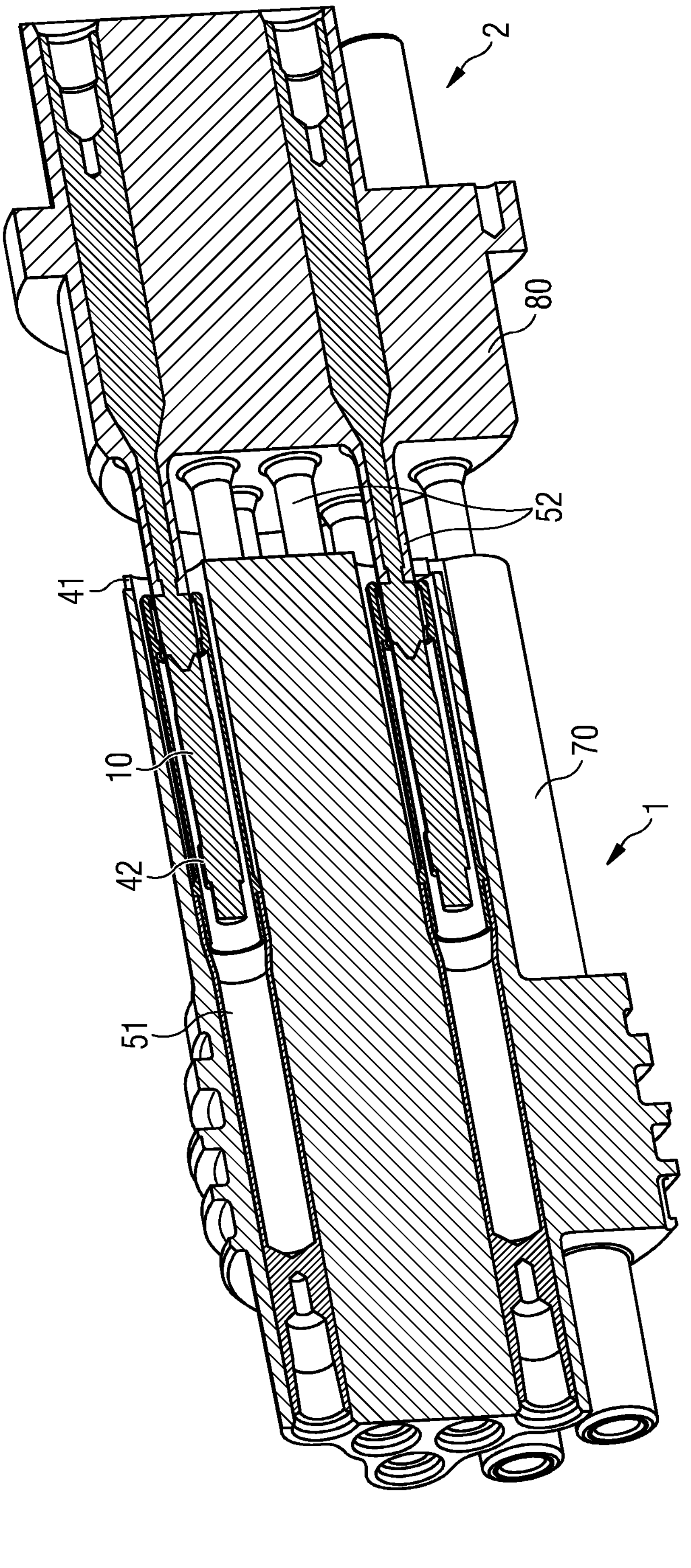
FIG. 4 illustrates a section through a plug part according to the present invention.
Figure 5:
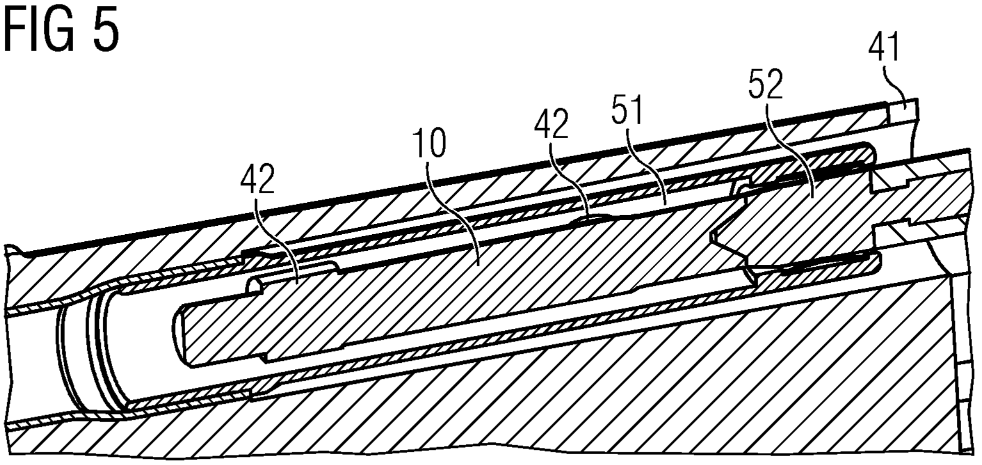
FIG. 5 illustrates part of the plug part of FIG. 4 in more detail.

FIG. 4 is a section through the plug body 70 and receptacle body 80 when mated and FIG. 5 shows more detail of part of this. In operation, when a male pin 52 of the receptacle is introduced into a female socket 51, a certain amount of fluid is displaced as the male pin 52 pushes the shuttle pin 10 back on its spring 11, into the plug body as shown. The annulus 40, maintained between part of the conductive female socket 51 and the solid dielectric 50, in combination with the secondary fluid chamber 22 of the secondary diaphragm ensures that this fluid displacement can be compensated for by allowing fluid flow through channels 41 between the annulus and the diaphragm and through the orifices 42. Thus, the structure comprises a conductive tube forming the socket contact, in the centre of, and co-axial with, two concentric insulators, the first inner insulator being the pressure compensating fluid, in this example, oil and the second outer insulator being the solid insulator, in this example, PEEK.

The conductive female contact 51 is located in the bore of the solid insulation, with an annulus 40 between the solid insulation 50 and the outer surface 56 of the electrical contact metal cylinder 51. The oil filled secondary diaphragm 16 fluid chamber 22 exchanges oil with annulus 40 and the cavity of the socket contact through the channel and openings in feature 41 and orifices 42. The primary advantages of the design according to the invention is that the reliance on the electrical performance of the oil is reduced, as the oil is primarily used for pressure compensation and the overall electrical performance is improved. A further benefit is that multiple contacts within a single housing and multiple insulators within one elastomeric diaphragm, lead to consolidation of parts and improvements in the ease of assembly and the oil filling of the diaphragms.

Figure 6:
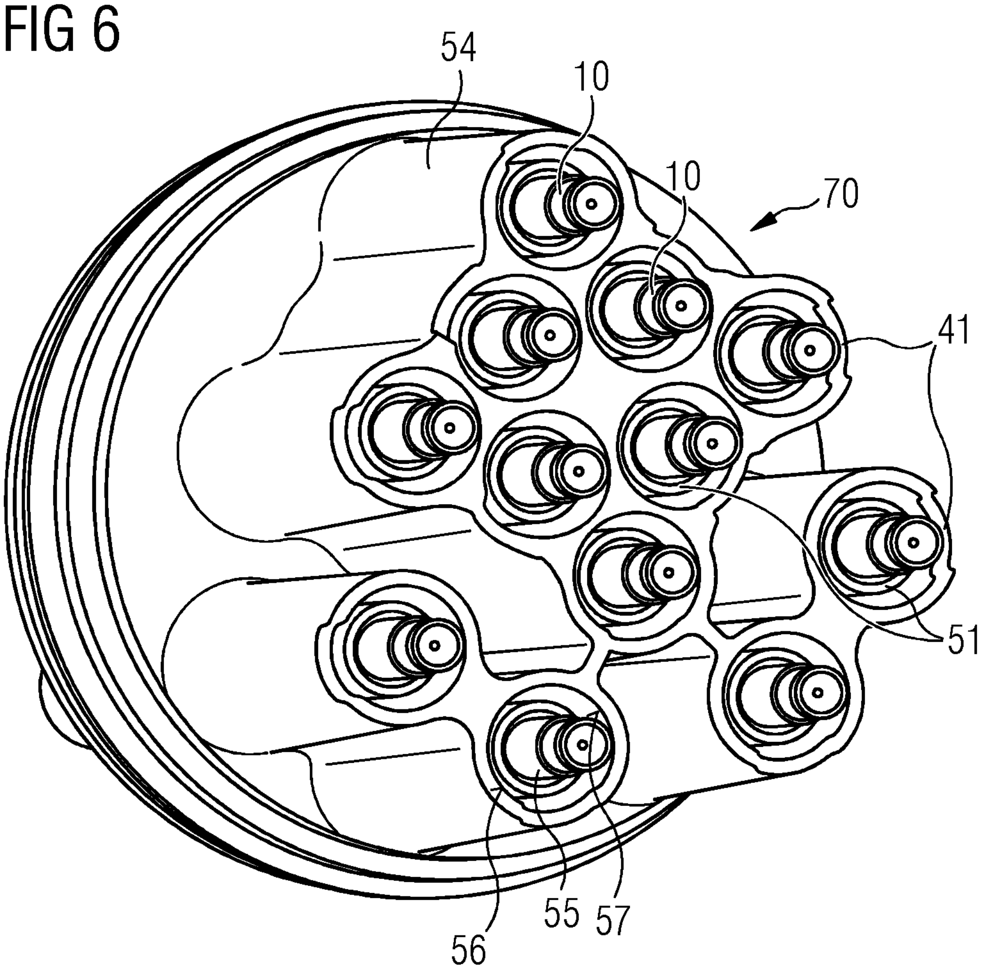
FIG. 6 is a perspective view of part of the plug part according to the present invention, with the shuttle pins exposed; and, FIG. 7 is a perspective view of part of the plug part according to the present invention, with the shuttle pins retracted and the diaphragm in place.

In summary, a plug 1 for a subsea connector comprises one or more female electrical contacts 51, each contact comprising a hollow cylinder, having an inner 55 and an outer 56 conducting surface, typically a metal, such as copper or a copper alloy, as well as a shuttle pin 10 adapted to receive a male contact pin 52 of a receptacle 2. Mounted radially outwardly of the female contact 51 outer conducting surface 56, along part of its length, the plug 1 further comprises a solid insulator 50 forming an annulus 40 between the external surface 56 of the female contact and an inner surface 57 of the solid insulator. The solid insulator, as can be seen in FIG. 6, may be formed around the conducting contacts 51 which form a data cluster 54. The solid electrically insulating material 50 combined with the fluid filled annulus 40 around the female contact of the plug enables pressure compensation to be provided by virtue of movement of fluid between the cavity on the inside of the female contact 51 and the annulus 40 via the orifices 42, or between the annulus 40 and the secondary fluid chamber of the diaphragm through channel 41. The solid insulation 50 improves electrical insulation resistance of the connector, as compared with a conventional oil and an elastomeric diaphragm design.

Figure 7:
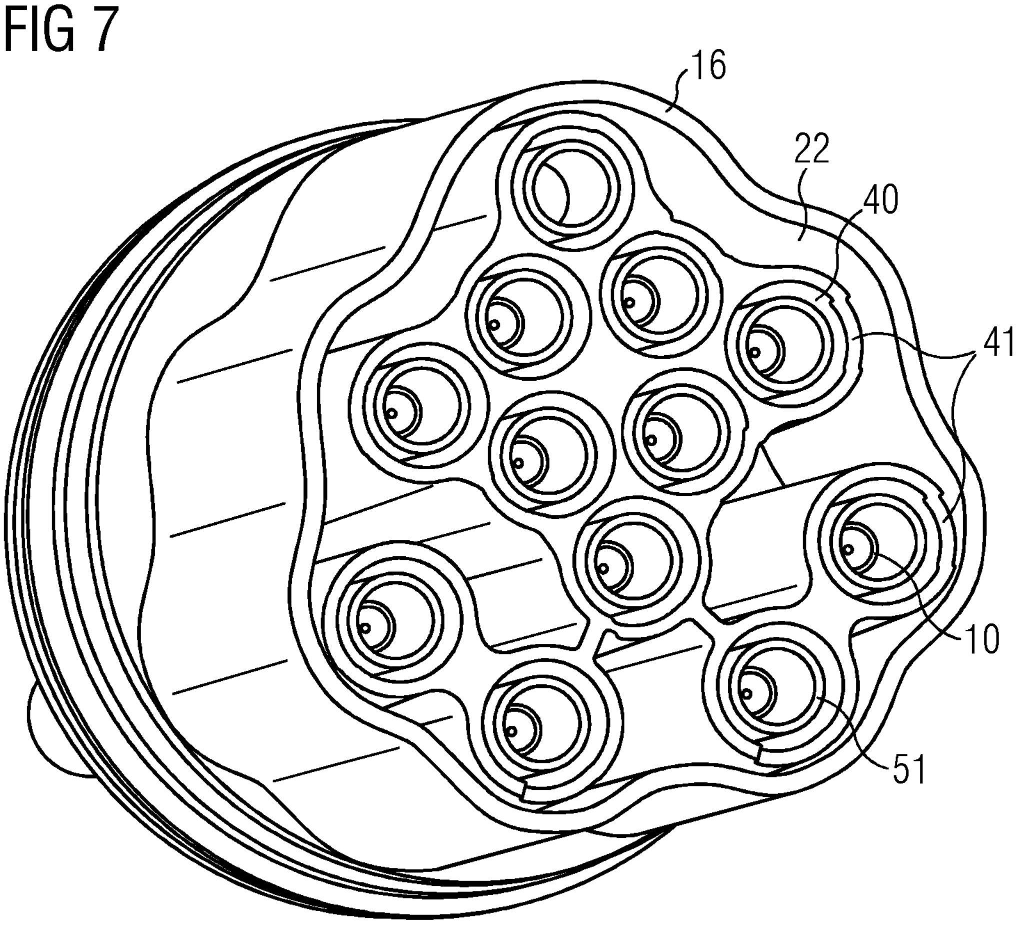

As shown in FIG. 7, a diaphragm 16 may be mounted radially outwardly of the solid insulation 50 to form the secondary fluid chamber 22. The solid insulation formed around the female contact 51 vents to the fluid chamber 22 of the diaphragm 16 mounted outside the solid insulation, through channel 41. The flexibility of the diaphragm 16 enables the fluid to be pressure compensated. When demated, the shuttle pin 10 (shown in FIG. 7 in its mated position, retracted into the cavity of the female contact 51) seals the cavity formed in the female contact 51, in which the shuttle pin 10 moves, and so contains the fluid within the female contact cavity. During mating, fluid is forced out of the inside of the contact cavity 51 and into the annulus 40, through orifices 42. During demating of the plug with the receptacle of the connector, fluid is able to flow back from the annulus 40 and if applicable the secondary fluid chamber 22, into the contact cavity via the orifices 42. The pressure compensating fluid provided in the annulus 40, diaphragm fluid chamber 22 and in the female contact cavity 51 may be an insulating fluid, such as oil, which further improves the overall electrical insulation resistance, but the oil is not the primary source of insulation resistance, so the connector is more reliable as it does not depend upon a fluid or material that becomes permeable over time.

Fluid flow between the female contact 51 and the annulus 40 is facilitated by providing one or more orifices 42 in a section of the contact body 51 to allow passage of the insulating fluid between the socket contact and the annulus and thence, through the channels 41 to the chamber 22 formed between the compensating diaphragm 16 and the annulus 40. The solid insulator 50 may comprise a polymeric or thermoplastic material, in particular PEEK, or other solid material with good electrical insulation characteristics. Although, a plug might have only one female contact for receiving a single male contact pin from the receptacle, more commonly, the plug comprises a plurality of contacts 51 and corresponding solid insulators 50 around each contact. The design allows for a common diaphragm for all the contacts. The invention is particularly applicable to multipin connectors, in which individually providing effective electrical insulation is difficult using conventional oil and diaphragm techniques because of the small size.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A plug part for a subsea connector, the subsea connector comprising a plug and a receptacle, the plug part comprising:

a female conducting contact assembly comprising a female contact comprising inner and outer conducting surfaces, the inner conducting surface defining a cavity;

the female contact assembly further comprising a shuttle pin within the cavity adapted to receive a male contact pin of a receptacle part;

wherein the female conducting contact assembly further comprises a rigid insulator mounted radially outward of the outer conducting surface and forming a fixed annulus between the outer conducting surface of the female contact and an inner surface of the solid insulator;

wherein the female conducting contact assembly further comprises an orifice in the female contact, the orifice providing a fluid channel between the annulus and the cavity, whereby fluid contained in a closed volume formed by the annulus, the orifice and the cavity, may flow between the annulus and the cavity.

2. The plug part according to claim 1, wherein at least one of the annulus and the cavity of the female contact contains an insulating pressure compensating fluid.

3. The plug part according to claim 2, wherein the insulating pressure compensating fluid comprises oil.

4. The plug part according to claim 1, wherein the plug part further comprises a diaphragm, mounted radially outwardly of the rigid insulator and defining a secondary fluid chamber formed between an outer surface of the rigid insulator and an inner surface of the diaphragm, and wherein the secondary fluid chamber operates to compensate pressure within the cavity.

5. The plug part according to claim 2, wherein the orifice of the female contact further comprises a plurality of orifices to allow passage of the insulating pressure compensating fluid between the cavity of the inner surface of the female contact and the annulus.

6. The plug part according to claim 4, wherein the closed volume further comprises the secondary fluid chamber.

7. The plug part according to claim 4, wherein an insulating pressure compensating fluid is provided in the secondary fluid chamber.

8. The plug part according to claim 4, wherein a channel is formed between the annulus and the secondary fluid chamber.

9. The plug part according to claim 1, wherein the rigid insulator comprises a polymeric or thermoplastic material.

10. The plug part according to claim 9, wherein the rigid insulator comprises polyether ether ketone (PEEK) or polyamide-imide (PAI).

11. The plug part according to claim 1, wherein the plug comprises a plurality of female contacts and corresponding solid insulators.

12. The plug part according to claim 1, wherein the female conducting contact is a first female conducting contact of a plurality of female conducting contacts wherein each female conducting contact of the plurality of female conducting contacts are identical to the first female conducting contact.

13. A wet-matable subsea connector, comprising: the plug and the receptacle, wherein the plug comprises the plug part according to claim 1.

* * * * *